Patented Oct. 21, 1930

1,778,858

UNITED STATES PATENT OFFICE

HANS JORDAN, OF BERLIN-STEGLITZ, GERMANY, ASSIGNOR TO THE FIRM CHEMISCHE FABRIK AUF ACTIEN (VORM. E. SCHERING.), OF BERLIN, GERMANY

PREPARATION OF PHENOL COMPOUNDS FROM DIHYDROXY-DIPHENYL-METHANE DERIVATIVES

No Drawing. Application filed July 5, 1927, Serial No. 203,681, and in Germany July 14, 1926.

My invention refers to the production of chemical products, more especially alkylated phenols and their products of hydrogenation.

In my copending application for patent of the United States filed July 12, 1926, Serial No. 122,031, and entitled "Production of alkylated phenols", I have described a process of producing alkylated phenols by treating a product of condensation of a ketone and a phenol with hydrogen in the presence of a catalyst until two hydrogen atoms have been fixed.

I have now ascertained that by treating with hydrogen at about 160° C. other derivatives of dihydroxy diphenyl methane, for instance the products of condensation of an aldehyde and a phenol, having the formula

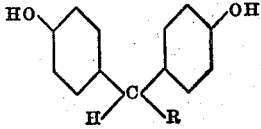

wherein R is hydrogen, an alkyl, or an aryl, valuable products can be obtained.

Example 1 p-dihydroxy diphenyl methyl methane is treated under pressure with hydrogen in the presence of 1 to 3 per cent of its weight of a nickel catalyst containing bismuth, the temperature being kept at about 160° C., until two hydrogen atoms have been fixed. There results p-ethyl phenol and phenol.

Example 2 p-dihydroxy diphenyl methane is treated as described with reference to Example 1, and p-cresol and phenol are obtained.

Example 3 p-dihydroxy triphenyl methane, if treated as described with reference to Example 1 results in p-benzyl phenol and phenol.

The catalysts mentioned above are prepared in the manner which is usual in the preparation of hydrogenation catalysts by precipitating from solutions of catalytically active metals the hydroxides or carbonates which are then ready for direct use or may first be subjected to a reduction treatment. The term "hydrogenation catalyst" used in the claims is intended to include products answering the above description.

Various changes may be made in the details disclosed in the foregoing specification without departing from the invention or sacrificing the advantages thereof.

I claim:—

1. The method of producing phenol compounds comprising treating a derivative of dihydroxy diphenyl methane with hydrogen in the presence of a hydrogenation catalyst at about 160° C. to effect hydrogenation.

2. The method of producing phenol compounds comprising treating a derivative of dihydroxy diphenyl methane with hydrogen under pressure in the presence of a hydrogenation catalyst at about 160° C. to effect hydrogenation.

3. The method of producing phenol compounds comprising treating a derivative of dihydroxy diphenyl methane with hydrogen under pressure in the presence of a hydrogenation catalyst at about 160° C. until two atoms of hydrogen have been fixed.

4. The method of producing phenol compounds comprising treating p-dihydroxy diphenyl methane in the presence of a hydrogenation catalyst at about 160° C. with hydrogen under pressure, until 2 atoms of hydrogen have been fixed.

In testimony whereof I affix my signature.

HANS JORDAN.